(12) United States Patent
Zarraga et al.

(10) Patent No.: US 7,332,080 B1
(45) Date of Patent: Feb. 19, 2008

(54) APPARATUS FOR SALT FREE WATER SOFTENING

(75) Inventors: Julie A. Zarraga, Bloomingdale, IL (US); Anil R. Oroskar, Oakbrook, IL (US); Gavin P. Towler, Barrington, IL (US); Kurt M. Vanden Bussche, Lake in the Hills, IL (US)

(73) Assignee: UOP LLC, Des Plaines, IL (US)

( * ) Notice: Subject to any disclaimer, the term of this patent is extended or adjusted under 35 U.S.C. 154(b) by 435 days.

(21) Appl. No.: 10/989,834

(22) Filed: Nov. 16, 2004

(51) Int. Cl.
*C02F 3/00* (2006.01)

(52) U.S. Cl. ............... 210/263; 210/269; 210/274; 210/278

(58) Field of Classification Search ............ 210/263, 210/269, 274, 278
See application file for complete search history.

(56) References Cited

U.S. PATENT DOCUMENTS

| | | | |
|---|---|---|---|
| 2,985,589 A | 5/1961 | Broughton et al. ........... 210/34 |
| 3,040,777 A | 6/1962 | Carson et al. ......... 137/625.15 |
| 3,201,491 A | 8/1965 | Stine et al. ................. 260/676 |
| 4,157,267 A | 6/1979 | Odawara et al. .......... 127/46 A |
| 4,182,633 A | 1/1980 | Ishikawa et al. .......... 127/46 A |
| 4,313,015 A | 1/1982 | Broughton ................. 585/828 |
| 4,319,929 A | 3/1982 | Fickel ....................... 127/46.2 |
| 4,402,832 A | 9/1983 | Gerhold ..................... 210/659 |
| 4,409,033 A | 10/1983 | LeRoy ...................... 127/46.2 |
| 5,080,700 A | 1/1992 | Bergloff et al. ............... 55/181 |
| 5,130,001 A | 7/1992 | Snyder et al. ........... 204/157.2 |
| 5,316,255 A * | 5/1994 | Marcusen .................. 248/362 |
| 5,478,475 A * | 12/1995 | Morita et al. .............. 210/676 |
| 5,676,826 A * | 10/1997 | Rossiter et al. ............. 210/91 |
| 5,685,897 A | 11/1997 | Belding et al. .............. 96/154 |

OTHER PUBLICATIONS

Dr. Ing. Herbert Knauer GmbH, CSEP® C9 Series Simulated Moving Bed Chromatography Systems Manual, Dec. 2000.

* cited by examiner

*Primary Examiner*—Chester T. Barry
(74) *Attorney, Agent, or Firm*—Arthur E Gooding

(57) ABSTRACT

A water softening system and process for softening water on an as needed basis is disclosed. The system and process softens water without the addition of a substitute metal exchange cation.

15 Claims, 7 Drawing Sheets

US 7,332,080 B1

APPARATUS FOR SALT FREE WATER SOFTENING

FIELD OF THE INVENTION

The field of the invention is the removal of compounds dissolved in water that contribute to the hardness of water. More particularly, the invention relates to an apparatus and method for softening water without the addition of a metal exchange cation.

BACKGROUND OF THE INVENTION

Hard water presents many concerns for domestic and industrial users. Hard water is water that has solids dissolved in the form of metallic compound, and most commonly alkaline earth metal carbonates such as calcium carbonate, and magnesium carbonate. Dissolved iron, manganese, and strontium also contribute to water hardness. When the concentration of these compounds are sufficiently high, the water is called hard. Hard water makes it more difficult for detergents and soaps to perform their cleaning functions, and subsequently requires more soap or detergent to perform the same amount of cleaning. Hard water that has high relative concentrations of iron compounds, concentrations above about 0.2 to 0.3 ppm, also can discolor clothing or other items that the hard water flows over. Hard water also contributes to the buildup of scale in commercial equipment, such as boilers and other industrial equipment, as well as buildup of scale on pipes. Scale is a buildup of mineral compounds on the walls of equipment and pipes. This reduces the efficiency of industrial equipment and reduces the life of pipes and boilers.

The classification of water hardness, as measured by the concentration of calcium carbonate is generally as listed in Table 1.

TABLE 1

Classification of water hardness

| Classification | mg/l or ppm | grains/gallon or gpg |
|---|---|---|
| Soft | 0-17.1 | 0-1 |
| Slightly hard | 17.1-60 | 1-3.5 |
| Moderately hard | 60-120 | 3.5-7 |
| Hard | 120-180 | 7-10.5 |
| Very hard | >180 | >10.5 |

Water hardness is based on ion-chemistry in ground waters, and is relatively stable over time. From the data of wells monitored by the US Geological Survey, a mean hardness was found to be about 217 ppm. From the monitoring of the wells, there are large portions of the United States that have moderately hard to very hard water. While this is not a health problem, but is merely a consequence of the nature of the environment, it also presents problems for many people and businesses that need softened water for uses such as domestic cleaning purposes, or industrial processes where the metallic compounds cause problems with equipment or processes.

Currently, most water softening involves the use of ion exchange resins, wherein the resins are periodically recharged with a salt that creates a soluble compound. Typically, the alkaline earth metal cations, calcium and magnesium, are exchanged with sodium which is supplied in the form of salt in a water softener using an ion exchange resin. The water softener must be periodically resupplied with salt, which is often in the form of large blocks of salt, or a supply of salt pellets that are placed in a container from which the water softener can recharge. Designing a water softener that does not require salt, saves the expense of buying salt, and the expense and time of periodically obtaining the salt and recharging the water softener.

SUMMARY OF THE INVENTION

The present invention comprises a method of continuously softening water where a hard water stream is contacted with a bed of adsorbent in an adsorption zone to remove the hardness compounds. The adsorbent bed is continuously moved from the adsorption zone to a desorption zone where the adsorbent is regenerated. The adsorbent bed is regenerated without the addition of an exchange metal cation. The method uses at least two adsorbent beds such that one adsorbent bed is removing hardness compounds when another adsorbent bed is being regenerated.

In one embodiment, the invention is an apparatus that comprises an actual moving bed adsorbent system having a plurality of adsorbent beds. The moving bed system includes an inlet for the hard water, an outlet for the softened water, an inlet for a regeneration stream, and an outlet for a flush stream for removing the hardness compounds from the system. The apparatus further includes a connection device for providing interconnections, or piping, between adsorbent bed inlets and outlets, and a motive device for automatically changing the network of interconnections and for moving the adsorbent bed between the adsorption and desorption zones.

The invention includes the use of an adsorbent that adsorbs metal carbonate compounds and metal bicarbonate compounds, and in particular, metals from the alkaline earth metals group. Adsorbents include ion exchange resins, zeolites, molecular sieves, and silicas.

Additional objects, embodiments and details of this invention can be obtained from the following detailed description of the invention.

DETAILED DESCRIPTION OF THE INVENTION

Figure 1:
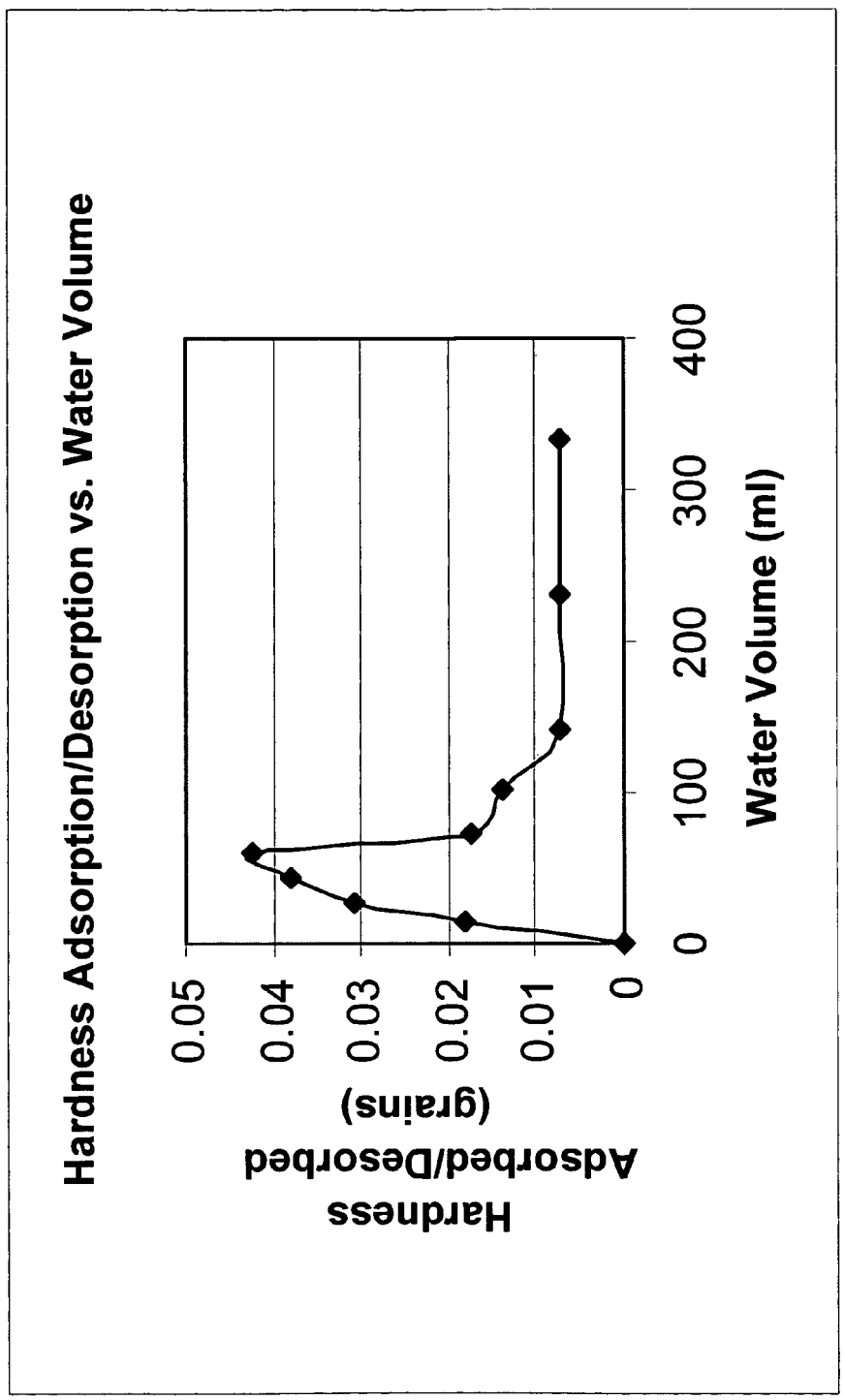
FIG. 1 is an example of the adsorption—desorption cycle for hardness.

The process of softening water is well known. Hard water generally comprises dissolved solids in the form of metallic carbonates. Usually, the compounds are in the metallic bicarbonate form and the metals are alkaline earth metals, most commonly the metals of calcium and magnesium, but can include other metals and other compounds of metals. Water softening comprises removing these hardness compounds and generally includes an ion exchange wherein dissolved metal cations of the alkaline earth elements are exchanged for other metal cations. The most common substitution is with sodium. Sodium is added in the form of salt, sodium chloride, and for the continuous softening of water, salt must be continuously added.

The ability to remove the hardness compounds without adding salt solves the problem of continuous salt addition, can provide for considerable savings, plus removes minerals without substituting other minerals.

The present invention is a process and apparatus for continuously softening water without the addition of salt. The process comprises contacting a hard water stream with a regenerable adsorbent to remove hardness compounds from the water in an adsorption zone. The adsorbent adsorbs the hardness compounds and components of the hardness compounds, sometimes adsorbing just the metal cation of the hardness compounds. The adsorbent is moved through the adsorption zone to a regeneration zone where the hardness compounds are removed from the adsorbent. The regeneration of the adsorbent is performed without the addition of a metal exchange cation.

Hardness of water is due to the presence of dissolve metallic compounds, which include, but are not limited to metal carbonates, metal bicarbonates, metal sulfates, metal chlorides, and metal nitrates. The metals for these compounds are alkaline earth metals and group VIII metals, in particular, calcium, magnesium, iron and manganese. The compounds formed include alkaline earth metal bicarbonates, alkaline earth metal carbonates, group VIII metal bicarbonates, group VIII metal carbonates, alkaline earth metal sulfates, alkaline earth metal nitrates, group VIII metal sulfates, and group VIII metal nitrates. The present invention is designed to remove these materials without replacing the removed materials with another metal ion.

It has been found that silica in the form of silica gel is a useful adsorbent for removing calcium and magnesium in the form of carbonates and bicarbonates. The present invention comprises a process for the continuous adsorption and desorption of dissolved metallic compounds by contacting a water stream having dissolved metallic compounds with an adsorbent. The adsorbent passes through an adsorption zone where the dissolved compounds are adsorbed onto the adsorbent. The adsorbent is then passed to a desorption zone where the adsorbed compounds are desorbed and removed. The adsorbent is regenerated in the desorption process and the cycle is repeated.

Without being held to any theory, it is believed that hard water has dissolved metallic compounds primarily in the form of metal bicarbonates. The metal bicarbonates are adsorbed onto an adsorbent and change to metal carbonates and give up carbon dioxide, as shown in eqn. 1.

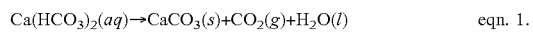

$$Ca(HCO_3)_2(aq) \rightarrow CaCO_3(s) + CO_2(g) + H_2O(l) \qquad \text{eqn. 1.}$$

The adsorbent, after adsorbing the metal carbonate is regenerated by washing with water and carbon dioxide to form an aqueous metallic bicarbonate, as shown in eqn. 2.

$$CaCO_3(s) + CO_2(g) + H_2O(l) \rightarrow Ca(HCO_3)_2(aq) \qquad \text{eqn. 2.}$$

Figure 2:
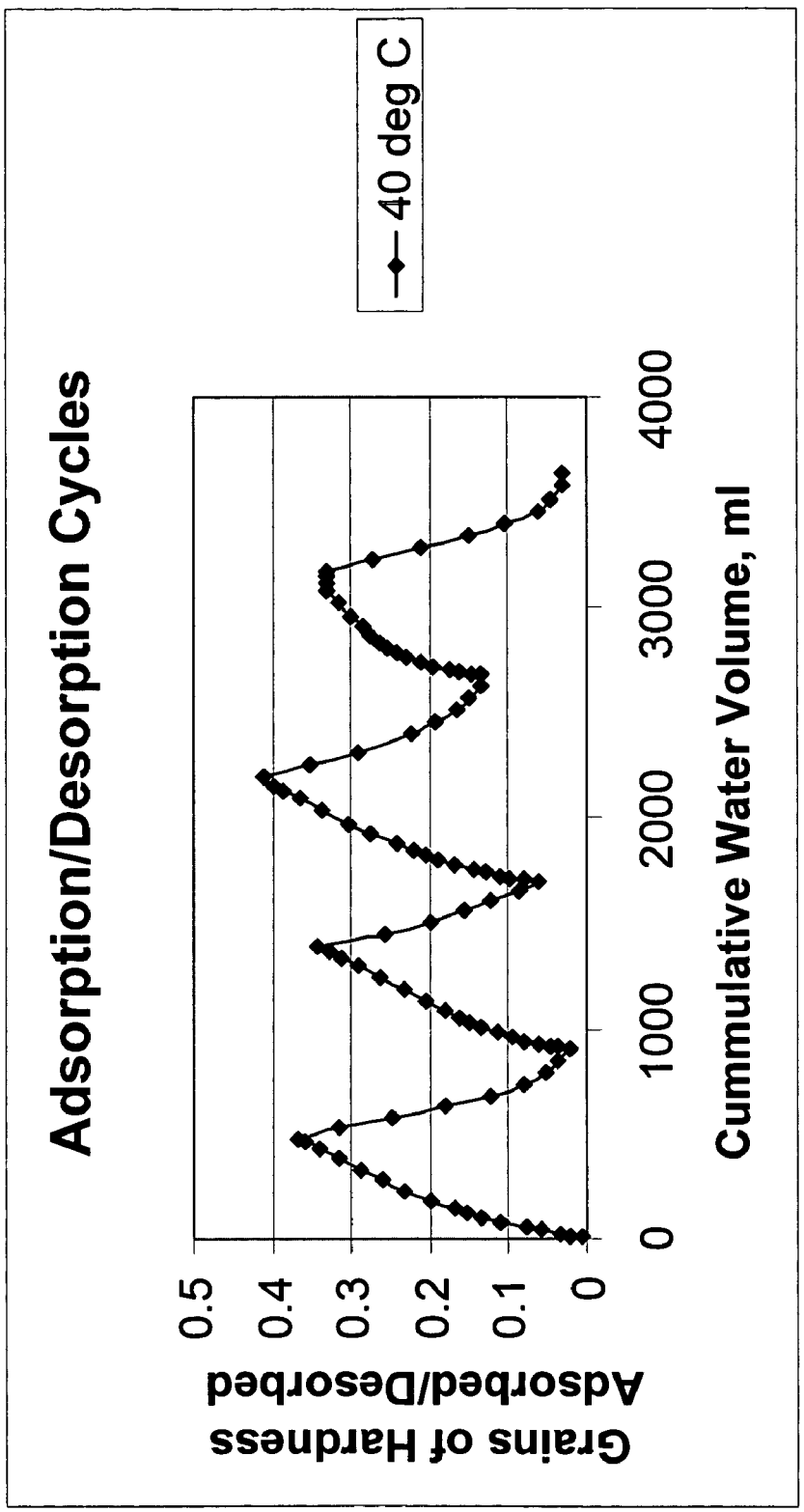
FIG. 2 is an example of the adsorption and regeneration through several cycles.

The adsorption and desorption of hardness compounds, in the form of calcium bicarbonate and calcium carbonate, was performed using various adsorbents. The desorption process used carbon dioxide ($CO_2$) at atmospheric pressure and room temperature. The results, as shown in FIG. 1, indicates the hardness compounds can be adsorbed from the water, and the hardness compounds can be desorbed under an aqueous solution with carbon dioxide to regenerate the adsorbent. The adsorbents tested, and useful in this invention, include UOP's zeolites Y-54, Y-84, Y-85, and LZ-210, and commercially available silica gel. The adsorbents were further tested at higher $CO_2$ pressures and temperatures, and the process was performed over multiple adsorption/desorption cycles, with the results shown in FIG. 2.

Adsorbents that are useful in this invention include, but are not limited to, ion exchange resins, zeolites, molecular sieves, silica, and mixtures thereof. Magnesia-silica gel, or magnesium silicate in the form available under the commercial name of Florisil™, by U.S. Silica Company, Berkeley Springs, W. Va., was tested. However, it was found that the magnesium contained in the adsorbent was desorbed during the adsorption of calcium from tap water, and therefore is not considered a preferred adsorbent.

Figure 3:
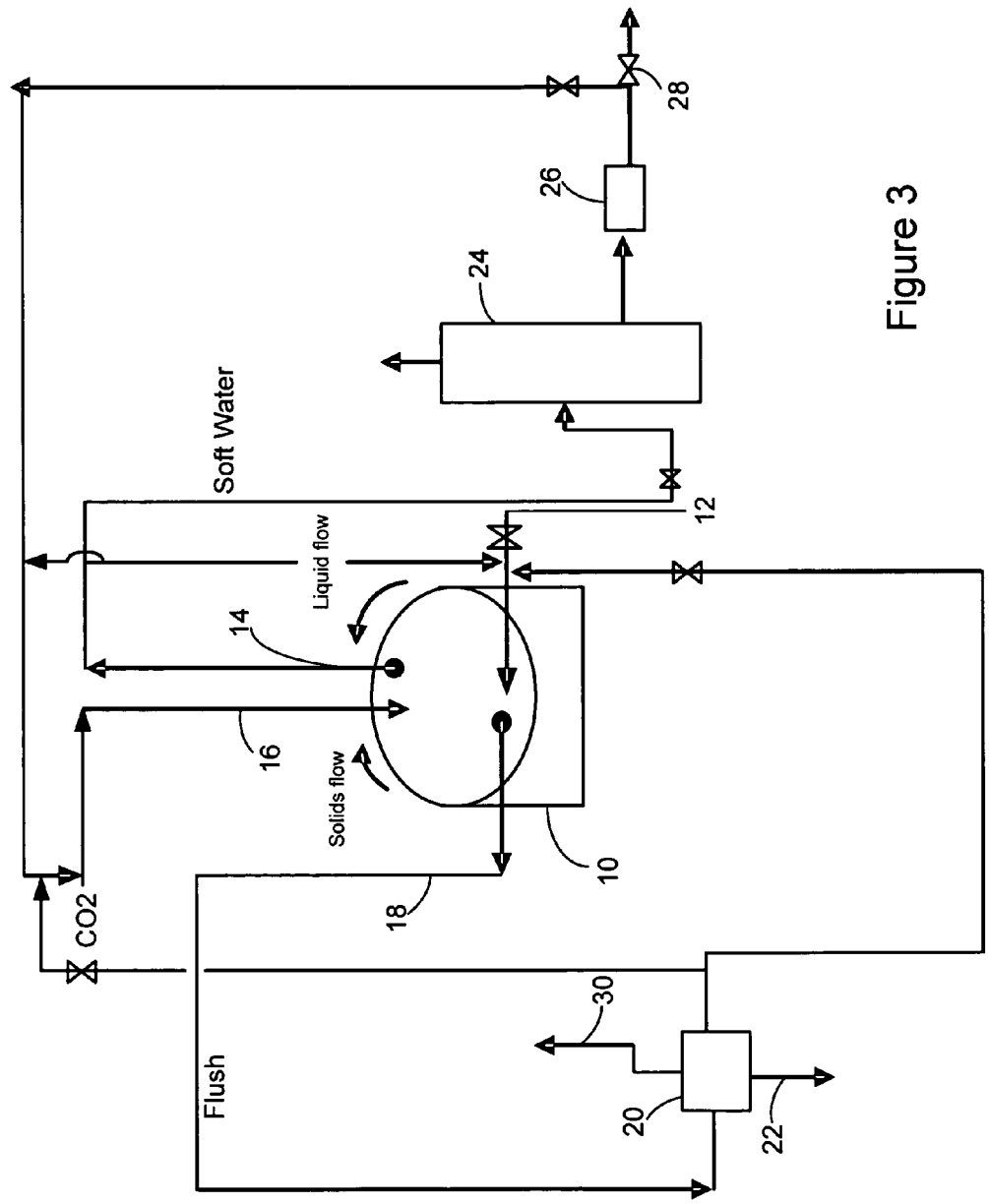
FIG. 3 is a diagram of a water softening unit of the present invention.

The present invention further includes an apparatus for the continuous softening of water. The apparatus, as shown in FIG. 3, includes a moving bed system 10 for contacting hard water with an adsorbent. The moving bed system 10 includes a plurality of adsorbent beds, where each adsorbent bed has an inlet, and an outlet. The adsorbent beds are interconnected to allow the flow of water to sequentially contact the beds, as the beds move through a preprogrammed sequence. The moving bed system 10 has an adsorption zone where hardness compounds are removed from the water and a desorption zone where the hardness compounds are removed from the adsorbent and flushed from the system. The moving bed system 10 also includes netflow ports. The netflow inlet ports are an inlet for the hard water 12 and an inlet for a desorbent 16. The netflow outlet ports are an outlet for the softened water 14, and an outlet 18 for the desorbent carrying the hardness compounds, or a flush stream. In addition, the moving bed system 10 includes a connection device having a plurality of ports for providing the appropriate connections between the adsorbent beds and the netflow ports. The moving bed system 10 further includes a motive device for automatically changing the connections between the adsorbent beds as the adsorbent beds move from the adsorption zone to the desorption zone.

The connection device can include a rotary valve for the invention when there is a plurality of stationary adsorbent beds for contacting with the hard water stream. With larger system requirements, a system of stationary beds with a rotary valve provides for greater throughput of water. This is a simulated moving bed, and is described in more detail in U.S. Pat. No. 2,985,589 (Broughton et al.), which is incorporated by reference in its entirety.

In an alternative, the beds are disposed on a rotary device. A small rotary device is sufficient for many small scale applications for water softening, including home usage. The rotary device is a module holding a plurality of adsorption units, and where the adsorption units are moved sequentially and in a counter-current manner to the flow of the water to be softened. The device comprises a plurality of adsorption units, with each adsorption unit having an inlet and an outlet, serially linked together to form a long virtual bed, wherein the outlet of one adsorption unit is in fluid communication with the inlet of a successive adsorption unit. There are a minimum of three adsorption units in the apparatus. The apparatus further comprises a valve for shifting the fluid communications of the net flow lines from a first adsorption unit to a second adsorption unit. The apparatus can have as few as three adsorption units, but preferably will have from 24 to 256 units, and more preferably have from 32 to 64 units.

The apparatus further includes a motor, or other motive device, for automatically turning the rotary device holding the adsorbent beds. The motor can be attached to the rotary device by a mechanical belt, by gears, by direct drive to an axle of the rotary device, or by other means to rotate the rotary device. Preferably, the motor has a control means to provide control over the rate of turning the rotary device. Means for rotating a device are well known in the art, and are not further discussed here. The contact time between the water and adsorbent can be regulated through control of the rotation rate of the adsorbent beds through the adsorption zone. This can be used to control the amount of softening of the water through the system.

The valve comprises a rotating plate assembly having a disk shape with a substantially flat sealing surface. The rotating plate further comprises a plurality of ports, where there are two ports for each adsorption unit, with each adsorption unit inlet in fluid communication with one of the ports, and each adsorption unit outlet in fluid communication with the other of the two ports. The rotating plate ports are disposed in an array around an axis of rotation. The valve further comprises a stationary plate having a substantially flat sealing surface in contact with the sealing surface of the rotating plate. The stationary plate includes a plurality of ports equal to the number of ports on the rotating plate. The ports on the stationary plate are disposed in an array to periodically align with the ports on the rotating plate as the rotating plate rotates about the axis of rotation. The stationary plate further includes a plurality of connecting conduits, equal to one less than the number of adsorption units. The connecting conduits connect pairs of ports on the stationary plate, leaving two ports unconnected to a conduit. Further information about the rotary device is presented in copending application Ser. No. 10/740,875, filed on Dec. 19, 2003, and which is incorporated by reference in its entirety.

The invention uses dissolved carbon dioxide in a water stream as a desorbent to regenerate the adsorbent. The desorbent removes the hardness compounds from the adsorbent and carries the compounds out in a flush stream. The carbon dioxide can be supplied from a cylinder of compressed carbon dioxide, or can be supplied from other sources, such as enriching $CO_2$ from the air. The dissolved carbon dioxide shifts the equilibrium such that the adsorbed metal carbonate forms a metal bicarbonate and dissolves in the water. The flush water carrying the dissolved metal carbonate is subsequently disposed of, and can be disposed of by sending it out with any waste water. Optionally, this flush water can be sent to a degassing and settling tank 20. In this tank 20, the water is heated and carbon dioxide is driven off. The metal carbonates precipitate out of solution, and are removed as a metal carbonate slurry 22. Water from the degassing tank 20 can be recycled to reuse as desorbent water. The carbon dioxide can also be recycled and reused to regenerate the absorbent.

The softened water from the moving bed system 10 is preferably passed to a storage tank 24, where the water is held until needed. A pump 26 pressurizes the water for sending a portion back to receive carbon dioxide and to use as desorbent water, as well as providing pressure to send softened water to softened water users. A valve 28 can be added to provide control of the pressure of the water softening system, and for controlling the amount of softened water that is recycled for use in the regeneration of the adsorbent.

Further details of the moving bed system are described in application Ser. Nos. 10/740,875 and 10/741,666, filed on Dec. 19, 2003, and are incorporated by reference in their entirety.

In the preferred operation of the water softening device, the desorbent is water, and preferably water with increased carbon dioxide dissolved in the water. It is preferable that the regeneration is performed with the minimum amount of water flowing over the adsorbent containing the adsorbed hardness compounds, or, in other words, that the amount of hardness compounds that can be accumulated in the flush water is maximized. One aspect of the solubility of hardness compounds, e.g. calcium carbonate and calcium bicarbonate, is under what operating conditions will the hardness compounds go back into solution. Simulations were performed to study the solubility of calcium in the presence of carbon dioxide. Increasing the partial pressure of carbon dioxide, which increases the amount of dissolved carbon dioxide, increases the conversion of calcium carbonate to calcium bicarbonate. The solubility of calcium as a function of the partial pressure of carbon dioxide was determined from the following equations:

$$P(CO_2)=[H^+]^2/(1.59*10^{-10}*[Ca^{++}]) \qquad \text{eqn. 3}$$

and $$P(CO_2)=[H^+]^2/(1.86*10^{-10}*[Ca^{++}]) \qquad \text{eqn. 4.}$$

Figure 4:
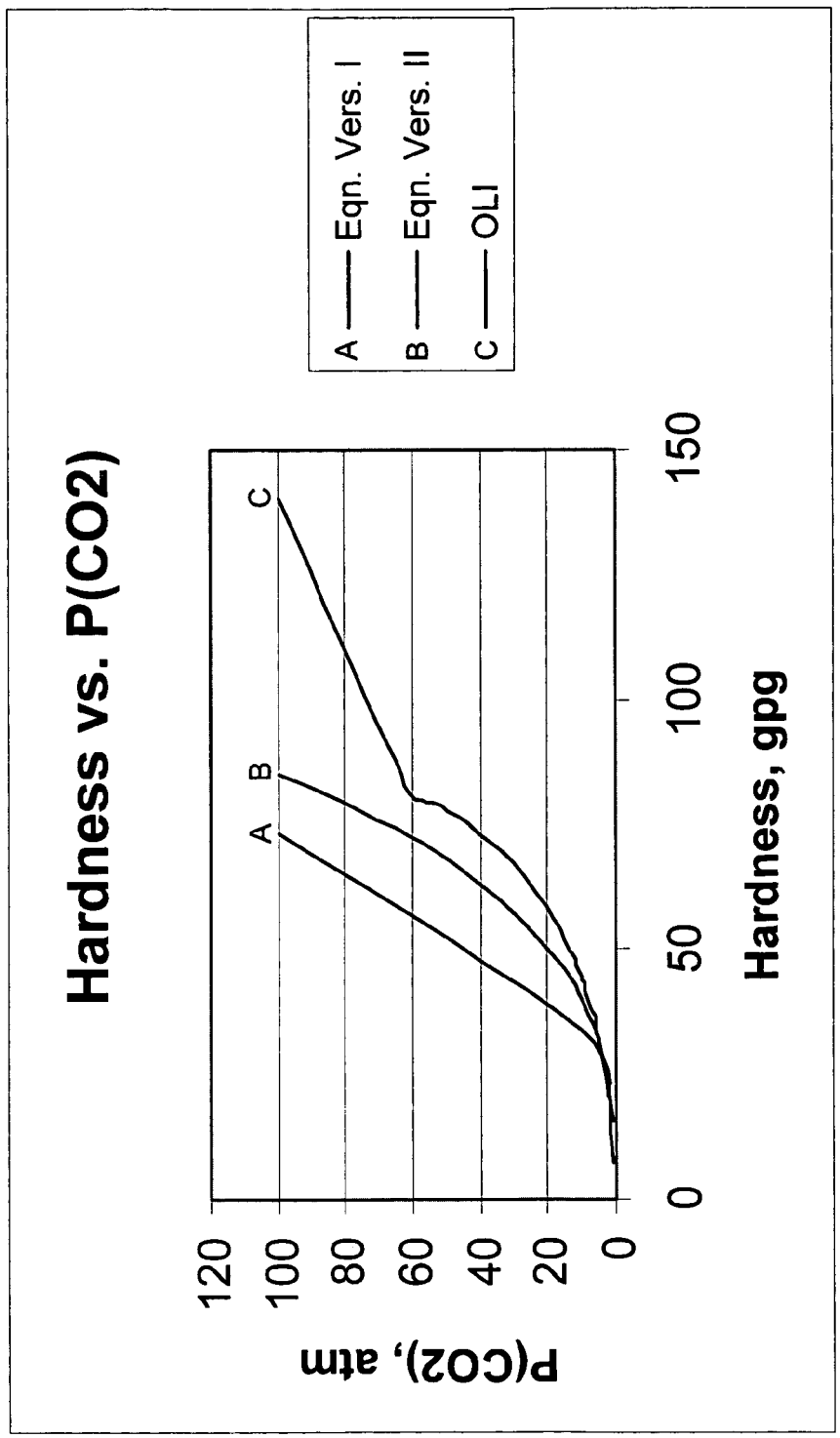
FIG. 4 is a plot of the hardness of water as a function of pressure of carbon dioxide.
Figure 5:
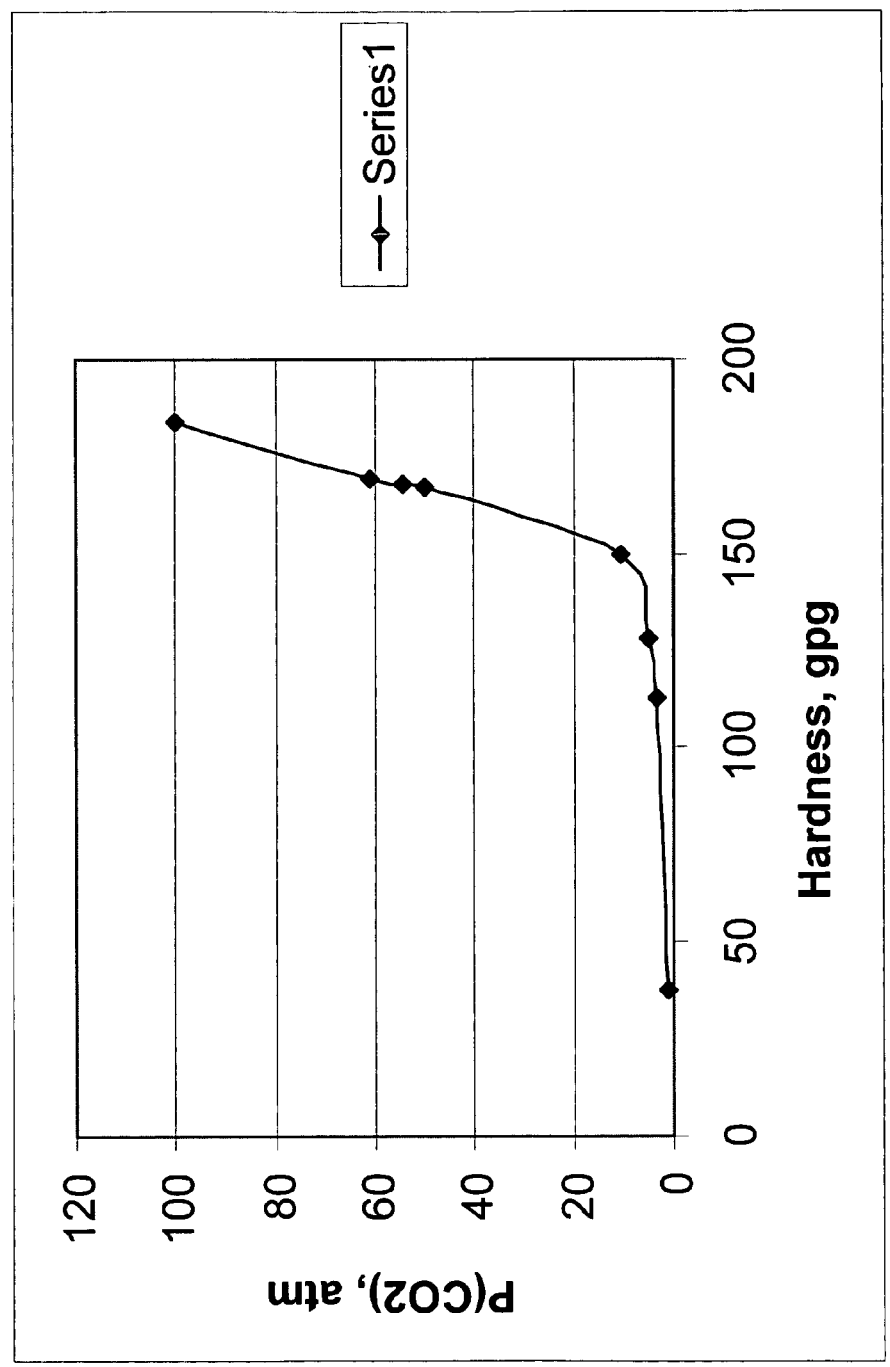
FIG. 5 is a plot of the hardness of water for magnesium as a function of pressure of carbon dioxide.

These equations compute the equilibrium between $CO_2$ and calcium in solution from different sources, and were plotted against a simulation in Aspen OLI™ varying the carbon dioxide partial pressure, as shown in FIG. 4. The solubility of hardness compounds is related to the amount of carbon dioxide in solution. The amount of carbon dioxide in solution is also related to the partial pressure of carbon dioxide, and therefore the hardness of water is related to the partial pressure of carbon dioxide and can be used to regenerate the adsorbent by redissolving the adsorbed hardness compound. At a $CO_2$ partial pressure of 1.14 MPa (11 atm), the hardness compound concentration in the water can be increased to between about 600 to 750 ppm (35 to 44 gpg) at equilibrium. The results indicate that operating the regeneration section of the water softening unit under increased $CO_2$ pressure will regenerate the adsorbent using less water. Magnesium is the second most common component of hardness found in most water supplies, therefore a similar simulation, using Aspen OLI™, was performed for determining the solubility of magnesium in the presence of $CO_2$, and the results are shown in FIG. 5. It was found from the simulation that the solubility of magnesium was in the range of about 2200 to 2300 ppm (130 to 135 gpg) for $CO_2$ at about 1.14 Mpa (11 atm).

Figure 6:
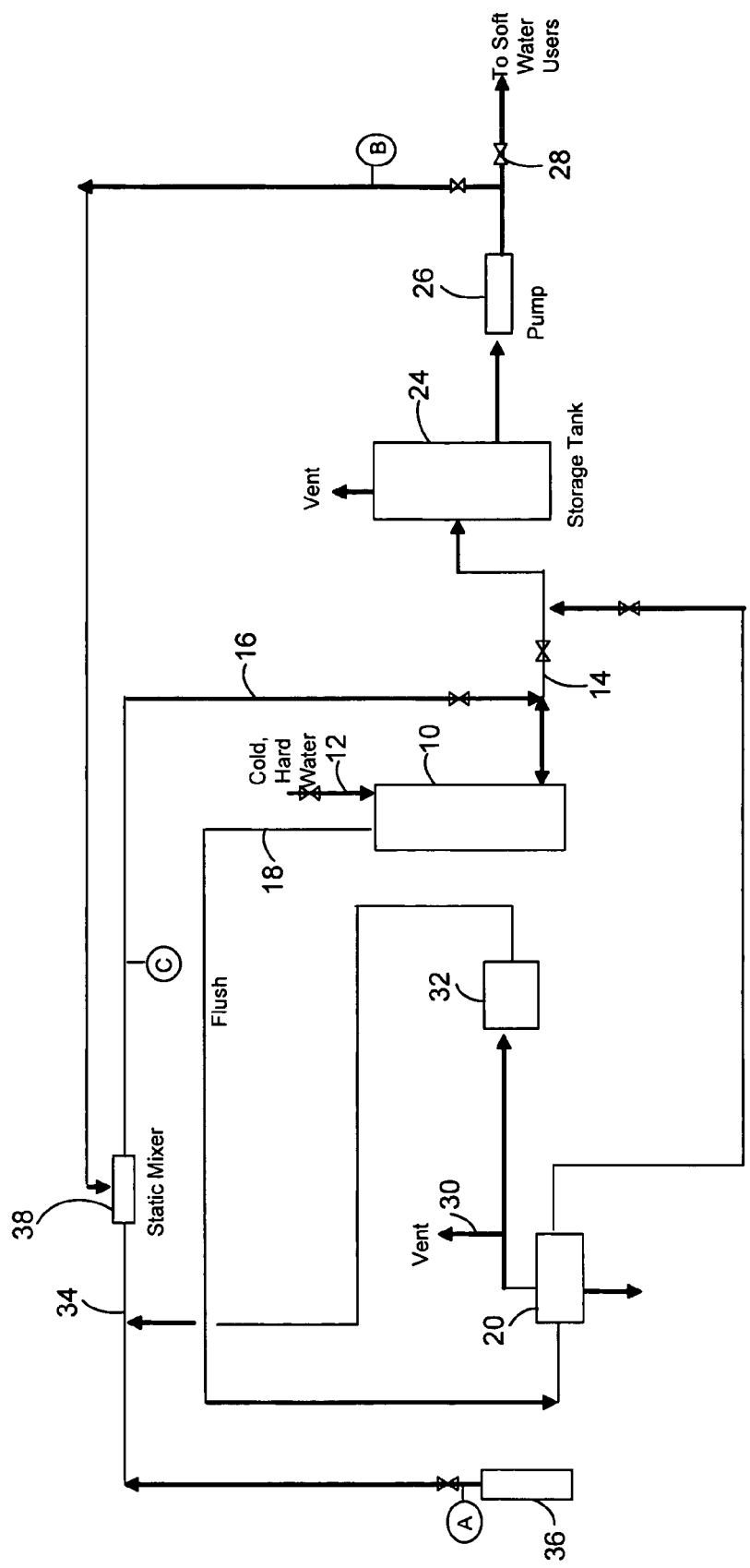
FIG. 6 is an alternate embodiment of a water softening unit of the present invention.

The flushed water with the increased concentration of hardness compounds, including predominantly calcium bicarbonate and magnesium bicarbonate, can be released into a holding pond, or allowed to drain into the ground water. In an alternative, the flushed water is directed to a degassing tank 20, where the pressure is dropped and the hardness compounds precipitate out of solution. Carbon dioxide can be vented through a vent 30, or recycled as shown in FIG. 6. In FIG. 6, the carbon dioxide from the degassing vessel 20 is compressed with a compressor 32 and directed to a line 34 connecting with a source of carbon dioxide 36. The carbon dioxide can be further driven out of solution through heating of the flushed water, increasing the amount of precipitation. The precipitated compounds can be removed as a slurry and disposed of.

The desorbent stream 16 is charged with carbon dioxide. The carbon dioxide is dissolved in water in a mixer 38 to form carbonic acid. The concentration of carbon dioxide in solution can be increased through pressurizing the desorption side of the system to increase the removal of hardness compounds from the adsorbent.

Figure 7:
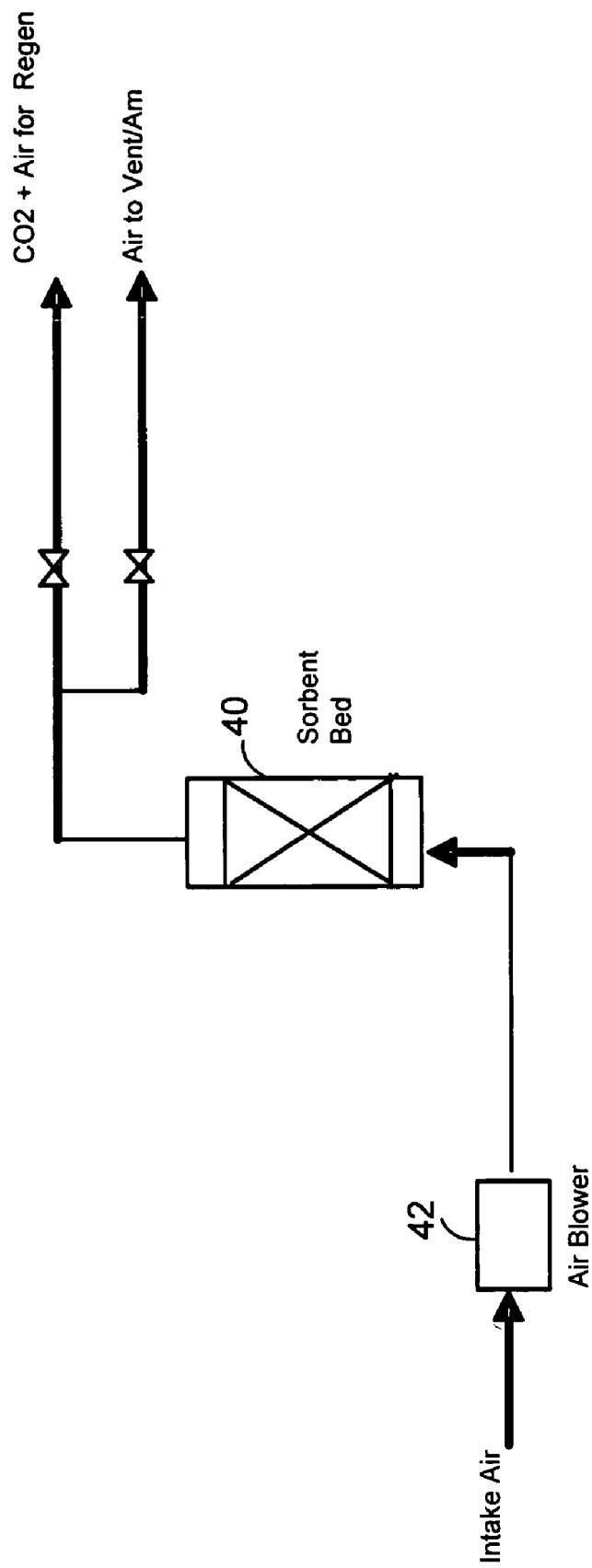
FIG. 7 is a diagram of an alternate source of carbon dioxide for use in regeneration.

In one embodiment, the source of carbon dioxide is from a cylinder 36 of compressed carbon dioxide gas. Carbon dioxide can also be extracted from the air using an adsorbent bed 40 as shown in FIG. 7. When using an adsorbent to increase the carbon dioxide concentration in air, a blower 42 is used to increase the pressure. This process alternates the pressure on the system between a vented air stream and a carbon dioxide rich stream.

In another embodiment, the adsorbent unit 10 can be either a fixed bed adsorbent unit 10 with a backflush system, or a moving bed adsorbent unit 10 for continuous generation of softened water.

EXAMPLE

By heating and degassing the flush water, a portion of the dissolved hardness compounds will precipitate out of solution, as described in equation 5.

eqn. 5

An experiment was run using a water sample with a hardness in the range of 450 to 500 ppm (26.5 to 29.5 gpg) of total hardness. This was also about 375 to 410 ppm (22 to 24 gpg) of calcium hardness. The sample was heated to 80° C. for one hour, and filtered using 0.02 micrometer media. The vessel was covered during heating to minimize water loss. This can also be accomplished in the invention by cooling the vented gas to recover water vapor. The filtrate was tested for hardness with an EDTA test kit, and was found to have a total hardness of about 257 ppm (15 gpg), or the hardness was reduced by approximately half.

While the invention has been described with what are presently considered the preferred embodiments, it is to be understood that the invention is not limited to the disclosed embodiments, but it is intended to cover various modifications and equivalent arrangements included within the scope of the appended claims.

What is claimed is:

1. An apparatus for the continuous softening of water comprising:
   a plurality of adsorbent units, where each adsorbent unit comprises an adsorbent bed, an inlet port, and an outlet port;
   at least two netflow inlet ports comprising a water inlet and a desorbent inlet and two netflow outlet ports comprising a water outlet and a desorbent outlet;
   a connection device comprising a plurality of ports for providing interconnections between the adsorbent bed inlets, the adsorbent bed outlets, and the netflow inlets and the netflow outlets; and
   a motive device for automatically changing the network of interconnections.

2. The apparatus of claim 1 wherein the adsorbent bed comprises an adsorbent selected from the group consisting of ion exchange resins, zeolites, molecular sieves, silica, and mixtures thereof.

3. The apparatus of claim 2 wherein the adsorbent is selected from the group consisting of zeolite Y-54, zeolite Y-84, zeolite Y-85, zeolite LZ-210, and mixtures thereof.

4. The apparatus of claim 1 wherein the two netflow inlets are a hard water inlet port and a desorbent water inlet port, and the two netflow outlet ports are a softened water outlet port and a hard wastewater outlet port.

5. The apparatus of claim 1 wherein the connection device comprises:
   a first plate assembly having a disk shape with a substantially flat sealing surface, having a plurality of first plate ports equal to the number of inlet and outlet ports of the adsorbent units with each port in fluid communication with one of the inlet and outlet ports of the adsorbent units;
   a second plate assembly with a substantially flat seating surface in contact with the first plate sealing surface, and having a plurality of second plate ports equal to the number of first plate ports; and
   a plurality of connecting conduits, each conduit having an inlet and an outlet and connecting two plate ports on one of either the first plate or second plate, wherein each conduit provides fluid communication between a first adsorbent bed outlet and a second adsorbent bed inlet.

6. The apparatus of claim 5 wherein the first plate assembly is a rotating plate assembly and the second plate assembly is a stationary plate assembly.

7. The apparatus of claim 6 wherein the adsorbent bed inlets and outlets are in fluid communication with the first plate ports.

8. The apparatus of claim 1 wherein the connection device is a rotary valve.

9. An apparatus for the softening of water comprising:
   an adsorbent unit, wherein the adsorbent unit comprises an adsorbent bed, an inlet, and an outlet;
   means for shifting the inlet from a hard water inlet to a desorbent inlet, and the outlet from a softened water outlet to a flush water outlet;
   a source of carbon dioxide wherein the carbon dioxide is mixed in a mixer to form the desorbent with water for regeneration of the adsorbent; and
   means for flowing the water with carbon dioxide over the adsorbent bed to remove hardness compounds which include compounds selected from the group consisting of metal carbonates, metal bicarbonates, and mixtures thereof.

10. The apparatus of claim 9 wherein the means for flowing softened water with carbon dioxide comprises a pump for returning a portion of the softened water to the mixer.

11. The apparatus of claim 9 further comprising a device for precipitating and separating metal carbonates from the hard water.

12. The apparatus of claim 11 further comprising a degasser for removing carbon dioxide from the flush water.

13. The apparatus of claim 12 further comprising a compressor to recycle recovered carbon dioxide from the degasser to the mixer for the desorbent.

14. The apparatus of claim 9 wherein the source of carbon dioxide is from compressed carbon dioxide in a cylinder or carbon dioxide recovered from air.

15. The apparatus of claim 9 further comprising a storage tank for the softened water.

* * * * *